Oct. 27, 1953
C. O. GLASGOW
2,656,896
HORIZONTAL SEPARATOR
Filed Jan. 11, 1950
2 Sheets-Sheet 1
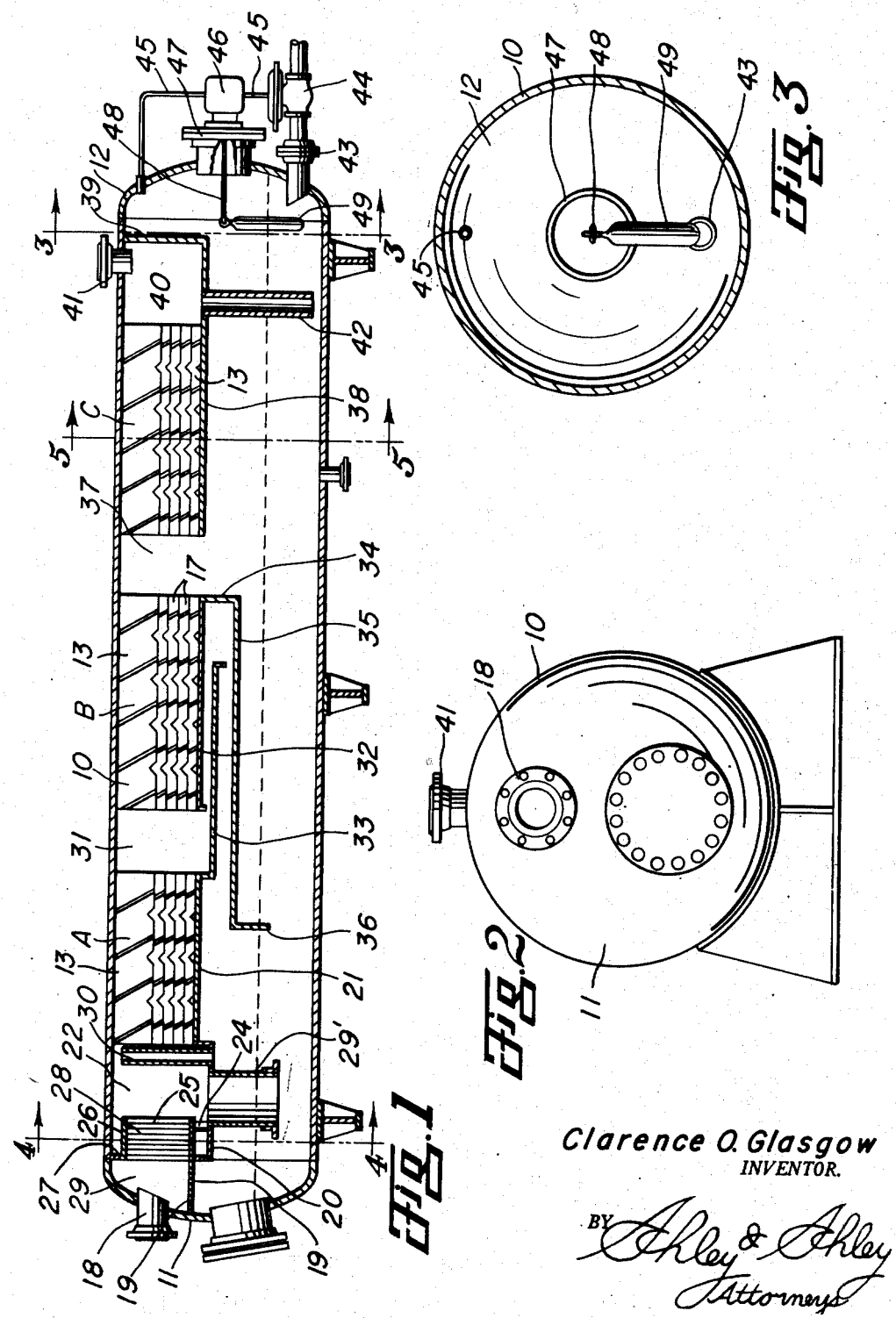
Clarence O. Glasgow
INVENTOR.
BY Ahley & Ahley
Attorneys Oct. 27, 1953 C. O. GLASGOW 2,656,896
HORIZONTAL SEPARATOR
Filed Jan. 11, 1950 2 Sheets-Sheet 2
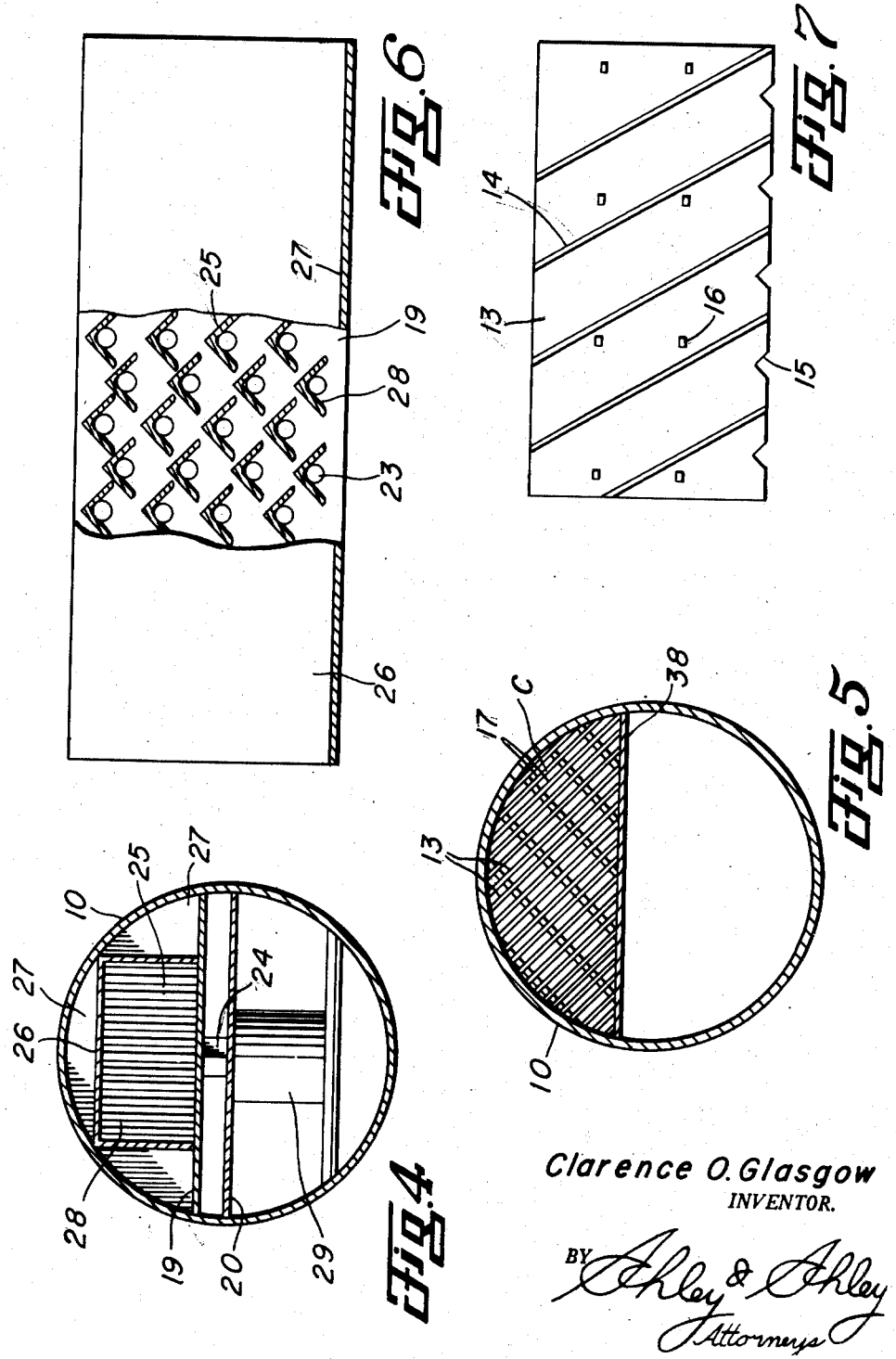
Clarence O. Glasgow
INVENTOR.
BY Ashley & Ashley
Attorneys Patented Oct. 27, 1953

2,656,896

UNITED STATES PATENT OFFICE 2,656,896

HORIZONTAL SEPARATOR

Clarence O. Glasgow, Tulsa, Okla., assignor to National Tank Company, Tulsa, Okla., a corporation of Nevada Application January 11, 1950, Serial No. 138,001

15 Claims. (Cl. 183—2.7)

This invention relates to new and useful improvements in horizontal separators.

One object of the invention is to provide an improved horizontal separator especially adapted to handle foamy oil.

Another object of the invention is to provide a horizontal separator having a plurality of separating units disposed in its foam and gas flow, in sequence and each unit including ribbon-like flow passages, whereby foam is dissipated and moisture or liquid extracted from the gas in successive stages.

A further object of the invention is to provide a horizontal separator wherein a liquid level is maintained below the separating units, with means adjacent the inlet and in advance of the first unit for extracting free oil and delivering it to the oil zone; together with a conductor for carrying gas evolved below the units to the top of the tank in advance of the first unit, so scrubbing of such gas is assured.

A still further object of the invention is to provide a separator having a horizontal separating unit of the character described and means whereby, the foam and gas are caused to enter and flow through the ribbon-like passages of at least one unit and the extracted oil is caused to flow over at least one degassing tray before reaching the oil level.

Still another object is to provide under some of the separating units, degassing trays, whereby oil extracted in the units is caused to travel an elongated path over the trays and is thoroughly degassed.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a longitudinal, vertical sectional view of a horizontal separator constructed in accordance with the invention, Fig. 2 is a front end elevation, Fig. 3 is a transverse sectional view taken on the line 3—3 of Fig. 1, Fig. 4 is a transverse, sectional view taken on the line 4—4 of Fig. 1, Fig. 5 is a similar view taken on the line 5—5 of Fig. 1, Fig. 6 is a partial plan view of the bottom plate of the scrubber, and Fig. 7 is a plan view of one of the separating plates.

In the drawings the numeral 10 designates an elongate, horizontal, cylindrical tank having crowned ends or heads 11 and 12 respectively, welded thereto. Within the tank, three separating units A, B and C respectively, are secured. These units are mounted in the upper portion of the tank, in spaced relation and each occupies a major portion of the upper half of the cross sectional area of the tank, as is best shown in Fig. 5. Each unit comprises a bundle of inclined baffle or separator plates 13, preferably disposed to incline downwardly at an angle of substantially 45° to the vertical axis of the tank. Each plate has its upper edge in contact with the inner surface of the tank wall.

The plates of each unit are spaced in close relation, preferably parallel, and this spacing may vary. As an example, a spacing of $\frac{1}{16}$ of an inch has been found satisfactory in some instances, where the bundle is approximately four to six feet long. Since there are three units, disposed in sequence in a flow path, it may be desirable to space the plates of a succeeding unit closer or farther apart than those of a preceding unit. As is best shown in Fig. 7, each plate is formed with a diagonal valley or duct 14, spaced so that liquids precipitated from the fluids passing between adjacent plates, may be agglomerated and caused to flow into these valleys and thereby conveyed to the lower edges of the plates.

A few of the plates have their lower edges in contact with the inner surface of the wall of the tank but the majority of the plates have their lower edges in a horizontal plane across the tank. The lower edges of the plates are provided with notches 15 to permit downward and transverse passage of the liquids, as will be hereinafter explained. In order to assure proper spacing of the plates, staggered spacing blocks 16 are secured on the upper surface of each plate. The bundles may be secured to the wall of the tank in any suitable manner. The plates 13 function in a manner similar to that set forth in Dixon Patent 2,349,944 and their broad expanse and close spacing forms ribbon-like flow passages 17.

An inlet nipple 18 is mounted in the upper portion of the head 11, and is aligned longitudinally and approximately centrally of the first separating unit A. A horizontal plate 19, disposed across the tank, extends from the head 11 rearwardly or inwardly toward the unit A, but terminates a substantial distance from said unit. This plate 19 overhangs the forward end of a transverse trough 20 extending across the tank. The forward edge of the trough is sealed to the underside of the plate 19; while the rear edge of said trough is secured to the forward edge of a bottom plate 21 secured to the lower edges of the plates of the unit A. The plate 19, trough 20 with the head 11, form a primary separating chamber 22, communicating with the unit A. The primary separating chamber and the unit A, together, comprise a liquid and gas separating enclosure having a closed bottom and completely enclosing the fluid inlet 18.

A portion of the plate 19, overhanging the trough is perforated as is shown at 23 in Fig. 6 and this overhanging portion is supported by an upright 24 mounted in the trough. Staggered vanes 25 rise from the perforations of the plate 19 and are angular in cross-section, being open to the inlet nipple 18. The upper ends of the vanes are secured to a top plate 26 and the vanes are framed by transverse blanking plates 27, secured to the wall of the tank. The perforated portion of the plate 19, the vanes 25 and the top plate 26, form a primary liquid extractor or scrubber 28. It will be seen that the oil and gas stream enters the space or inlet box 29 in advance of the scrubber and all components of said stream are caused to flow into said scrubber.

The stream which enters the scrubber 28 may comprise oil, free gas and foam. Foam or foamy oil does not have sufficient gravity to cause it to drop to the plate 19 or even into the trough 20, after passing through the scrubber. Oil which falls to the plate 19 will escape through the perforations 23 into the trough 20. Readily separable liquids will be extracted from the stream when the latter passes through the scrubber 28. The separating chamber 22 will be more or less filled with foam, gas and gaseous fluids.

A large flume 29' extends from the medial portion of the trough 20 down into the tank, below the oil level therein. Oil which is free of foam will flow down through said flume to the oil zone along the bottom of the tank. As before pointed out foam and foamy oil does not have sufficient specific gravity to cause it to flow down through the flume; however some foam or foamy oil may collect in the trough and in the upper end of the flume. Theoretically gas and perhaps some foam will enter the upper separating passages 17 of the unit A; while foamy oil will flow through the lower passages 17 and carry some foam with it. Since there will be gas in solution in the foamy oil and some gas in the foam, released gas and free gas will have a tendency to break up the foam. A pressure equalizing and gas escape pipe 30 leads from the bottom of the trough to the top zone of the tank, thus any gas released below the plate 19, trough 20 and bottom plate of unit A, will be conducted to the top of the chamber 22.

The fluids which enter the passages 17 will contain some liquid particles in suspension and foam. The fluids in flowing through the passages between the closely spaced plates will be scrubbed. These passages are of such length that the liquid particles or liquid bearing bodies, while traveling at a given velocity, will fall sufficiently to engage a plate surface before each particle or body completes its passage through a unit. This scrubbing action together with the agitation caused by the gas will dissipate the foam.

Due to the difference in density of the gas or gaseous fluid and the liquid in the stream and also due to the fact that in the flow of these component mixtures, the more dense, or liquid phase, particles will fall or descend at some velocity, it is manifest that by properly spacing the plates 13 the liquid particles touch and adhere to a collecting surface, before completing their travel through the separating element. As the liquid particles accumulate on the plate surfaces, several particles agglomerate until the globules or bodies so formed have sufficient weight to flow by gravity downwardly on said surfaces and through the notches 15. These liquids collect on the bottom plate 21. The ducts 14 are located between the notches and serve to prevent the fluid streams from sweeping any of the liquid particles to the rear end of the unit.

The fluid streams which escape from the unit A flow across a short space 31 to the unit B which has a bottom plate 32. A transverse tray 33 attached to the edge of the plate 21, extends rearwardly so as to underlie the space 31 and the unit B. Liquids extracted in the unit A flow rearwardly along the plate 21 and are discharged into the tray 33. The rear end of the tray 33 terminates short of a transverse apron 34 depending from the rear edge of the plate 32. A bottom tray 35 extends forwardly from the lower edge of the apron, under the tray 33 and terminates below the units A. A skirt 36 depends from the front end of the tray 35 into the body of oil below the oil level, thus any gas released between the trays and under the unit A is trapped and released through the pipe 30. The prolonged travel along the trays 33 and 35 acts to degas the oil.

Reference is made to the patent to Dixon, No. 2,349,944, which is now owned by the assignee of the invention herein set forth. In the Dixon patent, the well fluids which enter the tank are initially separated and the liquids drain through the pipe 16 thereof while the gaseous fluids pass rearwardly through the continuous flow passages 25 of said Dixon patent. In the invention herein set forth, the members 19, 20, 21 and 32, form a continuous division means or member which has an oil outlet 29' from the end discharging below the oil level in the tank and a final discharge for liquids from the tray 35. This arrangement has functions not possible in Dixon in that the spaced units A and B and the trays 33 and 35 provide an efficient liquid discharging and scrubbing means for the gaseous fluids after a travel through only the first unit A. The flume pipe 30 carries any gases evolved under the major portion of the division means up to the top of the tank so that they may enter the unit A.

The second scrubbing given in the unit B dissipates any foam which may be carried out of the unit A and of course, additional liquids are extracted from the gas. The unit C is separated from the unit B by a short space 37. Any liquids separated in the unit B escape from its rear end and fall into the oil body or stratum. The unit C has a bottom plate 38 which is extended at its rear end to a transverse wall 39 secured to tank wall, whereby a gas box 40 is formed. A gas outlet nipple 41 extends from the tank at the top of the gas box. A liquid discharge pipe 42 leads from the bottom of the gas box down into the oil stratum. Under usual conditions only gas will reach the unit C, but as this gas may have a high moisture control, a final scrubbing is desirable.

The oil which accumulates in the oil zone or stratum along the bottom of the tank is discharged through a pipe 43 in the head 12. A motor outlet valve 44 is connected in this pipe and a gas supply line 45 extends from the head 12 to said valve. A pilot valve 46 connected in this line is carried by a manway fixture 47 secured in the head 12. A flexible operating arm 48 is connected to the pilot valve and has a float 49 hung from its outer end immersed in the oil, whereby an oil level is maintained, as is common in this art.

What I claim and desire to secure by Letters Patent is:

1. A fluid separator including an elongate horizontal tank having an inlet at one end and a liquid outlet at its opposite end, a plurality of separating units spaced apart substantially in line in the upper portion of the tank and disposed longitudinally of the tank, said units each comprising a plurality of closely spaced plates extending longitudinally of the tank, a transverse member in the tank shutting off the bottom of the first unit from the tank therebelow, an elongate wide degassing conductor extending longitudinally in the tank and receiving liquid separated in the first unit and having a discharge to the lower portion of the tank, said tank having an oil level below said conductor, and a gas escape through the wall of the tank connected with the last separating unit.

2. A fluid separator as set forth in claim 1, with a separating chamber between the inlet and the first unit having a trough in its bottom, and a flume extending below the oil level from the trough whereby an oil seal for the lower end of the flume is provided and light foamy oil is prevented from passing down the flume.

3. A fluid separator as set forth in claim 1, with a separating chamber between the inlet and the first unit having a trough in its bottom, a flume extending below the oil level from the trough, and a scrubber composed of spaced vertical baffles between the inlet and the chamber.

4. A fluid separator including, an elongate horizontal tank having a fluid inlet at one end and a liquid outlet at its opposite end, said tank having an oil level longitudinally in its lower portion, a pair of longitudinally spaced separating units disposed in sequence longitudinally in the upper portion of the tank above the oil level and between the inlet and the outlet, whereby in passing from the inlet to the outlet a flow stream is caused to successively flow through said units, said units having bottoms, a flat horizontal tray disposed longitudinally in the tank below the space between the pair of units and above the oil level and extending from the bottom of the first unit so as to receive liquid separated in the first unit and having a discharge above the oil level, and a gas outlet from the upper portion of the tank.

5. A fluid separator as set forth in claim 4, with a second tray in the tank extending longitudinally from the bottom of the second unit below the first named tray and receiving liquid therefrom, said second tray being above the oil level and having a discharge at its forward end.

6. A fluid separator as set forth in claim 4, with a separating chamber in advance of the first unit having a liquid discharge conductor extending to a point within the lower portion below the oil level, a gas outlet conductor from the space below the chamber to the top portion of the tank in advance of the first unit, and a gas box around the last unit having a gas outlet through the wall of the tank and a gas inlet from the tank.

7. A fluid separator as set forth in claim 4, with a bottom wall between the inlet end of the tank and the first unit forming with the wall of the tank a chamber, a scrubber in the chamber in the path of the influent, a trough below the scrubber for receiving liquids therefrom, and a flume extending down from the trough to a point within the lower portion below the oil level.

8. A fluid separator including, an elongate horizontal tank having an inlet at its front end and an outlet at its rear end, said tank having an oil level along its longitudinal medial portion, a division member extending longitudinally from the front end portion of the tank, a plurality of superposed vertically spaced plates above the division member having their rear discharge ends open to the tank, a tray disposed longitudinally in the tank extending rearwardly below and from the rear ends of the plates having a discharge at its rear end, a second group of superposed vertically spaced plates in the tank between the first group of plates and the tank outlet, and a second tray underlying the first tray above the oil level and extending forwardly in the tank from the second group of plates and having a depending transverse member at its forward end extending below the oil level.

9. A fluid separator including, an elongate horizontal tank having a separating space in its upper portion and a liquid accumulating space in its lower portion, means for maintaining in the tank a liquid level in the liquid accumulating space at a point above the bottom of the tank, the tank having a fluid inlet and a liquid outlet, a liquid and gas separating enclosure in the upper portion of the tank adjacent the fluid inlet and having a closed bottom spaced above the liquid level, said enclosure completely enclosing the fluid inlet whereby foamy liquids entering the tank through the inlet are confined within the enclosure, the enclosure having an outlet into the tank spaced from said inlet, a liquid and gas separator in the enclosure between the fluid inlet and the enclosure outlet and through which the foamy liquids are caused to flow for degasification, a liquid discharge conductor extending downwardly from the closed bottom of the enclosure to a point near the bottom of the tank and having an open lower end below the liquid level whereby a liquid seal of said lower end is provided and foamy liquid is prevented from flowing down the conductor into the liquid space of the tank, and a gas discharge from the tank.

10. A fluid separator as set forth in claim 9, a flat horizontal tray extending from the outlet of the enclosure toward the liquid outlet, and a second liquid and gas separator having a closed bottom wall, said second separator being in the tank over the tray, and the tray being above the liquid level.

11. A fluid separator as set forth in claim 10, and a second tray in the tank above the liquid level, the second tray extending from the closed bottom wall of the second separator under the first tray.

12. A fluid separator as set forth in claim 11, wherein the second tray has a depending lip extending below the liquid level.

13. A fluid separator as set forth in claim 9, and a gas conducting pipe in communication between the upper portion of the separating enclosure and the space between the liquid level and the closed bottom of the enclosure whereby any gas trapped beneath the closed bottom may escape to the enclosure but foamy oil is prevented from entering the gas conducting pipe.

14. A fluid separator including, an elongate horizontal tank having a separating space in its upper portion and a liquid accumulating space in its lower portion, means for maintaining in the tank a liquid level in the liquid accumulating space at a point above the bottom of the tank, the tank having a fluid inlet and a liquid outlet, a liquid and gas separating enclosure in the upper portion of the tank adjacent the fluid inlet and having a closed bottom spaced above the liquid level, said enclosure completely enclosing the fluid inlet whereby foamy liquids entering the tank through the inlet are confined within the enclosure, the enclosure having an outlet into the tank spaced from said inlet, a liquid and gas separator in the enclosure between the fluid inlet and the enclosure outlet and through which the foamy liquids are caused to flow for degasification, the closed bottom of the gas separating enclosure having an opening therein through which liquids may flow downwardly from the enclosure, a liquid seal wall depending from the closed bottom of the enclosure to a point near the bottom of the tank and extending below the liquid level, the liquid outlet being spaced from the seal wall, the seal wall defining a zone with which the opening communicates and the seal wall separating the zone from the portion of the liquid space external to said zone, whereby foamy liquid is prevented from flowing through said opening and zone to said portion of the liquid space external to said zone, and a gas discharge from the tank.

15. A fluid separator including, an elongate horizontal tank having a separating space in its upper portion and a liquid accumulating space in its lower portion, means for maintaining in the tank a liquid level in the liquid accumulating space at a point above the bottom of the tank, the tank having a fluid inlet and a liquid outlet, a liquid and gas separating enclosure in the upper portion of the tank adjacent the fluid inlet and having a closed bottom spaced above the liquid level, said enclosure completely enclosing the fluid inlet whereby foamy liquids entering the tank through the inlet are confined within the enclosure, the enclosure having an outlet into the tank spaced from said inlet, a liquid and gas separator in the enclosure between the fluid inlet and the enclosure outlet and through which the foamy liquids are caused to flow for degasification, a liquid discharge flume extending downwardly from the closed bottom of the enclosure to a point near the bottom of the tank and having an open lower end below the liquid level whereby a liquid seal of said lower is provided and foamy liquid is prevented from flowing down the flume into the liquid space of the tank, and a gas discharge from the tank.

CLARENCE O. GLASGOW.

References Cited in the file of this patent

UNITED STATES PATENTS

| Number | Name | Date |
|---|---|---|
| 1,516,132 | Allen et al. | Nov. 18, 1924 |
| 1,864,511 | Jones | June 21, 1932 |
| 1,910,728 | Waters | May 23, 1933 |
| 1,916,065 | Mount et al. | June 27, 1933 |
| 2,009,646 | Brady | July 30, 1935 |
| 2,349,944 | Dixon | May 30, 1944 |
| 2,507,273 | Schultz | May 9, 1950 |